UNITED STATES PATENT OFFICE.

THOMAS M. BELTO, OF PHELAN, TEXAS.

ROLLING CATTLE-GUARD.

1,250,948. Specification of Letters Patent. Patented Dec. 25, 1917.

Application filed April 16, 1917. Serial No. 162,474.

*To all whom it may concern:*

Be it known that I, THOMAS M. BELTO, a citizen of the United States, residing at Phelan, in the county of Bastrop, State of Texas, have invented certain new and useful Improvements in Rolling Cattle-Guards; and I do hereby declare the following to be a full, clear, and exact description of the invention, such as will enable others skilled in the art to which it appertains to make and use the same.

This invention relates to improvements in cattle guards.

An object of the present invention is to provide a cattle guard of the "surface" type embodying means of novel construction for inflicting upon an animal attempting to cross the guard, sufficient punishment to frighten and deter it in its attempt.

The invention further proposes a guard embodying a roller and a serrated plate disposed in such relation to the roller as that the latter will deflect a leg or legs of the animal attempting to cross the guard, against the serrations of the plate and then inflict such punishment as will insure the retreat of the animal from the guard.

With the above and other objects of similar nature in view, the invention consists in the construction, combination and arrangement of parts, set forth in and falling within the scope of the appended claim.

Figure 1:
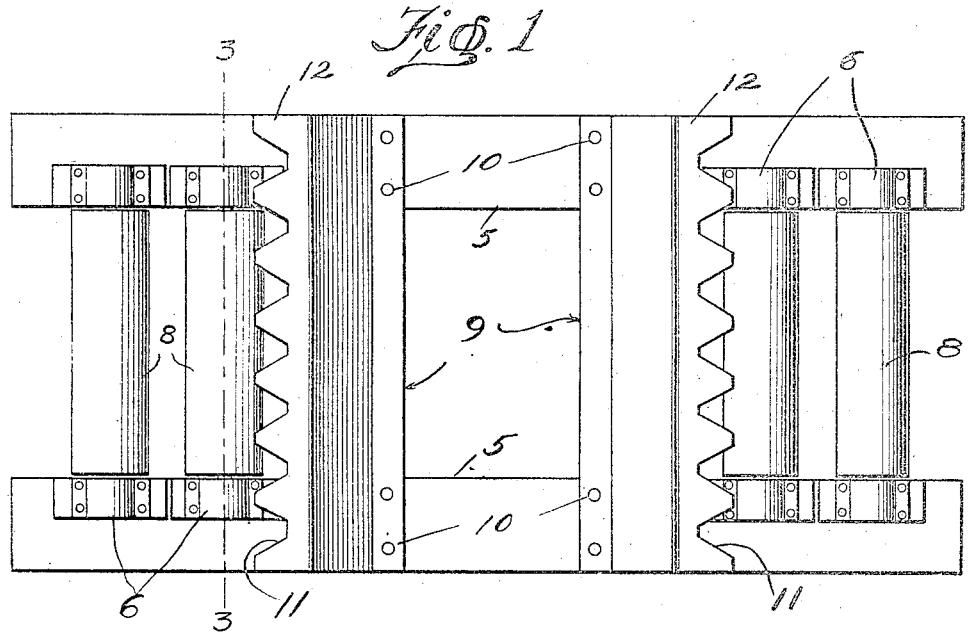
Figure 1 is a top plan view of a section of the improved cattle guard.
Figure 2:
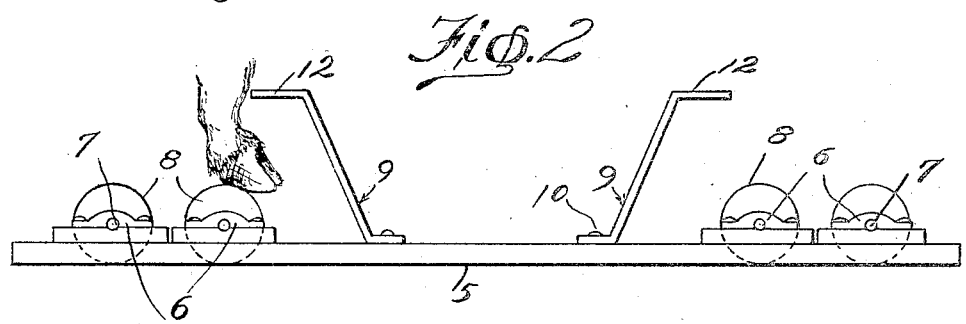
Fig. 2 is a side elevation thereof, showing in dotted lines the position assumed by an animal's leg when attempting to cross the guard.
Figure 3:
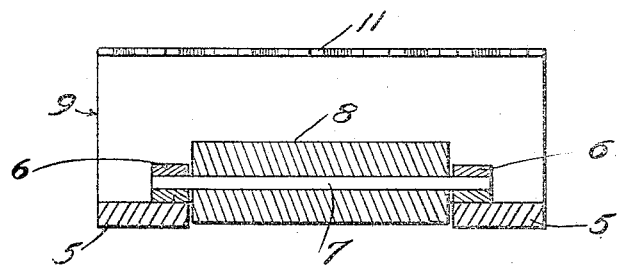
Fig. 3 is a transverse section taken on the line 3—3 of Fig. 1.

The guard is made preferably of a plurality of sections which are similar in construction, it being preferable at each crossing or other point to use six sections, three on each side of the crossing arranged one between the rails of the track and one at each side of the track. A description of one section will therefore apply to and suffice for all.

Referring now more particularly to the accompanying drawing there is illustrated one section of my improved guard consisting of a pair of side rails 5 disposed in spaced parallel relation and constructed of wood, metal or other suitable material. Arranged upon and secured to the side rails 5 adjacent each end are pairs of transversely alined bearings 6, there being journaled in said bearings between the rails parallel shafts 7 on which are mounted and fixed in any suitable manner a set of spaced rollers 8. A transversely extending plate 9 is engaged upon and secured as at 10 to the upper faces of the rails 5 inwardly of each set of rollers. This plate extends upwardly at an angle from the rails 5, as shown, and has its upper or free edge portion serrated as at 11 and bent as at 12 to lie in a substantially horizontal plane with the serrations 11 directed toward the related set of rollers.

It will be understood that each section of the guard may be spiked or otherwise secured to the ties upon which it is disposed, and that, when in position, an animal in attempting to cross the section will step upon the rollers 8, said rollers turning or rotating under the weight of the animal and causing its leg to be deflected against the serrated edge of the adjacent plate, thereby inflicting such punishment as will deter it from crossing.

What I claim is:—

A surface cattle guard comprising spaced side rails, a roller journally supported between said side rails, and a plate secured between and extending above the side rails with its upper edge serrated and directed toward and in a plane above the rollers whereby an animal stepping upon the roller will have its leg deflected against said serrated edge thereby deterring the animal from crossing the guard.

In testimony whereof, I affix my signature, in the presence of two witnesses.

THOMAS M. BELTO.

Witnesses:
J. G. PRORY,
T. A. GALLOWAY.

Copies of this patent may be obtained for five cents each, by addressing the "Commissioner of Patents, Washington, D. C."